3,346,525
NON-YELLOWING BAKING-TYPE MALIC ACID MODIFIED STYRENATED ALKYD/AMINE RESIN COATING COMPOSITIONS AND THE MALIC ACID MODIFIED STYRENATED ALKYDS THEREOF

Bernard C. McAvoy, San Francisco, Calif., assignor to The Glidden Company, Cleveland, Ohio, a corporation of Ohio
No Drawing. Filed Feb. 25, 1964, Ser. No. 347,120
20 Claims. (Cl. 260—22)

This invention relates to malic-acid-modified "styrenated" alkyds which are well suited for use as film modifiers in white baking enamels. They are particularly suited for use in white coatings because of their non-yellowing tendencies when baked in conventional bake ovens.

In use, the alkyds of the invention are mixed with amine/aldehyde resins to provide baked and thermoset coatings having good protective qualities for metal and other substrates.

Accordingly it is an object of this invention to provide malic-acid-modified "styrenated" alkyds characterized by exhibiting good non-yellowing qualities when baked.

It is a further object to provide improved white baking enamels employing the foregoing alkyd(s) as film modifiers.

It is another object to provide baking enamels such as described in the preceding object which include solvent-soluble alkylated amine/aldehyde resins blended therewith.

The alkyd resins are first prepared as polyesters and then the polyesters are "styrenated" by treating them with styrene, vinyl toluene, etc. in the presence of organic peroxide polymerization catalyst(s). The resulting resinous products are soluble in naphtha-type hydrocarbon solvents and stronger inert solvents.

The "styrenated" alkyd resins are formulated from the following materials:

(1) Soybean oil acids or the oil itself, dehydrated castor oil, dehydrated castor oil acids, safflower oil and/or safflower oil acids, and/or tall oil.

(2) Saturated aliphatic polyol(s) having 3–6 carbons and at least 3 esterifiable hydroxyls, e.g. glycerine, pentaerythritol, trimethylol propane, trimethylol ethane, etc.

(3) Non-ethylenic carboxylic materials having 8–10 carbons and 2 esterifiable carboxyls, e.g. phthalic anhydride, phthalic acid, terephthalic acid, isophthalic acid, tetrahydrophthalic acid, hexahydrophthalic acid, and sebacic acid.

(4) Malic acid.

(5) Styrene and/or any of the vinyl toluenes.

The oil acids and polyhydric alcohol are proportioned so as to provide about 1 mol of fatty acid per 3–3.4 mols of alcoholic hydroxyl groups; i.e. in the approximate mol ratio of monoglycerides such as where the polyhydric alcohol is glycerine. It is not necessary to start with free oil acids since it is well known that natural and synthetic glyceride oils (i.e. soybean and dehydrated castor) can be treated with extra polyhydric alcohol in the presence of catalyst (i.e. by alcoholysis) so as to secure an equilibrium mixture which has the fatty acids and hydroxyl groups in the above-expressed molar ratio of 1 to about 3. Thus, one can start with the oils, subject them to an alcoholysis treatment with added polyhydric alcohol, and then, without removing the resulting mixture from the kettle, can proceed to convert the latter into a polyester product by adding and esterifying phthalic and malic acid. After the acids have been suitably combined into the product, the "styrenation" can then proceed, again in the same kettle.

The phthalic or other non-ethylenic dibasic acid(s) or anhydride(s), the malic acid and the fatty acids are proportioned together with the polyhydric alcohol(s) and hydroxyls of the malic acid so that the total number of hydroxyls is present in about 4–10 molar percent over the total number of carboxyls present. Also, the molar ratio of phthalic or other dibasic acid (counted as anhydride) to malic acid is preferably between about 3:1 and 12:1. Moreover the molar ratio of dehydrated castor oil acids and/or other fatty acids to safflower and/or soybean oil acids can be varied widely but preferably can be from zero up to about 0.55 to 1. In other words, castor oil acids and/or tall oil acids can be omitted entirely if desired. However, I prefer to have the latter acids and especially the castor oil acids, present at ratios between about 0.33 and 0.55 to 1.

In the finished "styrenated" alkyds of the invention, the amount of "styrenating" material (e.g. styrene or vinyl toluene) can vary from about 34% up to about 50% based on the weight of solids in the finished, "styrenated" alkyd. On the same basis, the amount of malic acid chemically combined into the "styrenated" alkyd is between about 1% and 4% by weight. I have found that more than about 4% malic acid only gives a product from which the excess precipitates out in unreacted form, and hence represents a waste of malic acid. At least about 1% of malic acid is needed to bring about whatever modification of chemical structure it is which makes the product non-yellowing in comparison with the same alkyd from which the malic acid has been omitted.

Accordingly, the following summary of formulation, based on weight percent of the total ingredients, indicates the kinds and amounts of starting materials which can be used by preference to reach a finished "styrenated" alkyd of the invention.

|  | Percent |
|---|---|
| Soybean oil, safflower oil, dehydrated castor oil and/or tall oil acids | 20–38 |
| Added polyol | 6.8–11 |
| Phthalic anhydride or equivalent acids named above | 13.0–21.5 |
| Malic acid | 1.0–4.0 |
| Styrene, vinyl toluene, etc. | 34–50 |

In respect to the above summary; it will be understood that the oils can be re-cast into their chemically equivalent amounts of oil acids and glycerine, on the basis that they are triglycerides of mixed fatty acids for which the respective average molecular weights are as follows:

|  | Avg. mol. weight |
|---|---|
| Soybean oil | 879.5 |
| Dehydrated castor oil | 885.5 |
| Tall oil acids | 840 |
| Safflower oil | 879 |

On this basis the summary appears as follows:

|  | Percent (by weight) |
|---|---|
| Soybean oil acids | |
| Safflower oil acids | 19–34 |
| Dehydrated castor oil acids | |
| Tall oil acids | |
| Total saturated polyol | 8.5–15 |
| Phthalic anhydride and/or the other named dibasic acids | 13–22 |
| Malic acid | 1.0–4.0 |
| Styrene and/or vinyl toluene | 34–50 |

The following examples illustrate the principles of the invention and include the best modes presently known to me for practicing the invention in accordance with those principles.

Example I

A "styrenated" alkyd is prepared from the following kinds and amounts of starting materials:

| | | Resin Components only, weight percent |
|---|---|---|
| A. Soybean oil, safflower oil or mixtures | 1,180 lbs | 25.6 |
| B. Dehydrated castor oil | 396 lbs | 8.6 |
| C. Pentaerythritol | 316 lbs | 6.85 |
| D. Phthalic anhydride | 605 lbs | 13.10 |
| E. Malic acid | 160 lbs | 3.47 |
| F. Vinyl toluene [1] } Mix | 1,950 lbs | 42.38 |
| G. Ditertiary butyl peroxide } | 20 lbs | |
| H. Sublimed litharge | 05 lbs | |
| J. Xylol | 35 U.S. gal | |
| K. VM&P naphtha [2] | 421 U.S. gal | |
| L. 2, 5 ditert. butyl hydroquinone | 20 grams | |

[1] Meta and para methyl styrene.
[2] Aliphatic solvent having a Kauri Butanol value of 34–40 and a distillation range of: Initial boiling point, 246–252° F.; Dry end point, 276–287° F.

Heat A and B together to gain 400° F. Add C and H. Gain 450° F. and hold for optimum monoglyceride content. Then add D, E and J, followed by one-sixth of the F, G mixture. Gain reflux (315–325° F.) hold 20 minutes and then add another sixth of the F, G mixture. Repeat at 20-minute intervals until all of the latter mixture has been added. After last addition, gain reflux and hold for Y–Z viscosity (Gardner-Holdt) at 60% non-volatile in J and at 77° F. Add K and then add L.

The finished product has a non-volatile content of 60%, a Garner-Holdt viscosity of Y–Z, an acid number of 18–21 (based on the alkyd solution), and a weight per gallon of 7.6 lbs.

The sublimed litharge of Example I can be replaced with any other effective alcoholysis catalyst(s).

Example II

A "styrenated" alkyd like that of Example I is prepared so as to contain about 1% malic acid. The formulation is as follows:

| | Percent (wt.) |
|---|---|
| Soybean oil | 26.30 |
| Dehydrated castor oil | 8.90 |
| Penaerythritol | 7.04 |
| Phthalic anhydride | 13.40 |
| Malic acid | 1.01 |
| Vinyl toluene (as in Ex. I) | 43.35 |
| | 100.00 |

The alkyd is prepared in the same way as that of Example I, except that the final acid number is 10–12, based on the finished alkyd solution.

Example III

A non-yellowing film-former of the invention is formulated as follows:

| | | Wt. percent |
|---|---|---|
| A. Tall oil acids | 1,476 lbs | 32.45 |
| B. Glycerine (99%) | 160 lbs | 3.50 |
| C. Pentaerythritol | 316 lbs | 6.95 |
| D. Phthalic anhydride | 605 lbs | 13.30 |
| E. Malic acid | 45 lbs | 1.0 |
| F. Vinyl toluene (as in Ex. I) } Mix | 1,950 lbs | 42.8 |
| | | 100.00 |
| G. Ditertiary butyl peroxide } | 20 lbs | |
| H. Xylol | 35 U.S. gallons | |
| I. VM&P naphtha (as in Ex. I) | 421 U.S. gallons | |
| J. 2, 5 ditertiary butyl hydroquinone | 20 grams | |

Load A, B, C, D and H into a reactor and heat to reflux (400–425° F.). Hold at this temperature to an acid number of about 30 or below. Cool to 300° F. and add E plus one-sixth of the F, G mixture. Repeat at 20-minute intervals until all of the latter mixture has been added. Then hold at reflux for a Gardner-Holdt viscosity of Y–Z, measured at 60% non-volatile in I.

The finished product has a non-volatile content of 60% a Gardner-Holdt viscosity of Y–Z and an acid number of 9–12 (based on the finished solution).

Example IV

Example I is repeated exactly except for using 1576 lbs. of soybean oil instead of the indicated mixture of soybean and dehydrated castor oils.

Example V

A "styrenated" alkyd like that of Example I is prepared so as to contain about 1.75% malic acid. The formulation is as follows:

| | Percent (wt.) |
|---|---|
| Soybean oil | 26.10 |
| Dehydrated castor oil | 8.77 |
| Pentaerythritol | 7.00 |
| Phthalic anhydride | 13.30 |
| Malic acid | 1.77 |
| Vinyl toluene (as in Ex. I) | 43.06 |
| | 100.00 |

The materials are processed exactly as described in Example I.

Example VI

An all-glycerine "styrenated" alkyd is prepared from the following starting materials:

| | | Resin Components only in percent (wt.) |
|---|---|---|
| A. Soybean oil | 1,936.00 lbs | 20.04 |
| B. Dehydrated castor oil | 1,048.00 lbs | 10.82 |
| C. Synthetic glycerine (99%) | 1,048.00 lbs | 10.82 |
| D. Malic acid | 160.00 lbs | 1.65 |
| E. Caustic soda | 6.00 lbs | |
| F. Phthalic anhydride | 2,074.00 lbs | 21.44 |
| G. Styrene (rubber grade) } | 1,771.00 lbs | 18.34 |
| H. Vinyl toluene } Mix } Mix | 1,632.00 lbs | 16.89 |
| I. Ditert. butyl peroxide } | 33.75 lbs | |
| J. Xylol | 474.00 lbs | |
| K. 2,5-ditertiary butyl hydroquinone | 46.00 grams | |
| L. Xylol | 6,335.00 lbs | |
| M. VM&P naphtha | 2,288.00 lbs | |

Charge A, B, and C into reactor under an inert gas atmosphere and maintain atmosphere during all processing, and heat to 300° and add E dissolved in water; heat to 470° and hold for optimum monoglyceride content; cool to 300°, add D, F, and J and one-sixth of G, H, I mixture, insert water separator, gain reflux (315° to 325°). Hold for 20 minutes. Repeat for five more one-sixth additions of the mixture, holding 20' at 315° after each addition. After the last addition reflux the mass to a T viscosity (Gardner-Holdt) measured at 50% non-volatile in a solvent mixture of 73.5% xylol and 26.5% V.M.&P. naphtha by slowly gaining temperature to a maximum of 425°. Cool, add K, L, and M and filter.

The finished film-forming solution has an acid number (on solids) of 8–12, a non-volatile content of 50%, and a weight per gallon of 7.89 lbs.

Example VII

A white baking enamel using the "styrenated" alkyd solution of Example I is formulated as follows:

|   | Lbs. |
|---|---|
| A. TiO$_2$ pigment | 206 |
| B. Castor oil solution [1] | 4 |
| C. Alkyd solution of Example I | 250 |
| D. Alkyd solution of Example I | 88 |
| E. Aromatic hydrocarbon solvent (e.g. xylol) | 90 |
| F. VM&P naphtha of Example I | 170 |
| G. n-Butanol | 12 |
| H. Ethylene glycol monobutyl ether | 8.0 |
| I. Butylated urea/formaldehyde resin 60% solids in 35% butanol, 59% xylol | 100 |
| J. Grease solution [2] | 5.0 |

[1] 60% solids in xylene; a soft paste.
[2] 35% solids solution composed of 149° (B.P.) petrolatum dissolved in coal-tar solvent naphtha.

A, B and C are ground together to a 7.5–8 grind (Hegman gauge), then E–J are added in the order listed. The resulting enamel has a non-volatile content of 50% and requires no reducer for spray application to metal or other substrate. The applied coating and substrate are baked for 7 minutes at 270° F. On a thirty minute bake at 270° F. (used as a test over-bake situation) the enamel remains white and free of the usual yellowing encountered when non-malic-modified "styrenated" alkyds corresponding to that of Example I are used in such an enamel.

Example VIII

Comparable results are secured in Example VI when the "styrenated" alkyd solution of Example I thereof is replaced with an equal solids content of the "styrenated" alkyd solutions of Examples II, III, IV, V or VI.

Example IX

A white enamel for metals using the "styrenated" alkyd resin for Example I is formulated as follows:

|   | Lbs. |
|---|---|
| A. TiO$_2$ pigment | 258 |
| B. Castor oil solution of Example VIII | 5 |
| C. "Styrenated" alkyd solution of Example I | 152 |
| D. Hydrocarbon solvent [1] | 56 |
| E. "Styrenated" alkyd solution of Example I | 272 |
| F. VM&P naphtha of Example I | 70 |
| G. n-Butanol | 6.5 |
| H. Ethylene glycol monobutyl ether | 8.0 |
| J. Butylated urea/formaldehyde resin of Example VII | 128.0 |
| K. Grease solution of Example VII | 5.0 |

[1] E.G. xylol or Socal No. 2. The latter has a Kauri Butanol value of 92, is 10% aromatic, balance paraffines and naphthenes, has an initial boiling point of 280° F. and a dry end point of 330° F. It weighs 7.149 pounds per gallon.

Grind A, B, C and D together to a 7.5–8 grind, then add E–K in the order listed. The finished enamel has a non-volatile content of 62%, a viscosity of 40–50 (No. 4 Ford Cup) at 80° F. and weighs 9.6 lbs. per gallon. For spray application the enamel is reduced at the rate of 6:1 with the hydrocarbon solvent D, above. The applied coating is baked 7 minutes at 270° F. An intentional overbake of 30 minutes at 270° F. does not cause the baked coating to yellow even slightly.

While the method of preparing the alkyds of the invention is preferably that shown in Example I, other procedures can be used, as illustrated by the next example.

Example X

The following formulation is used:

|   |   |
|---|---|
| A. Soya oil | 1,180 lbs. |
| B. Castor oil | 396 lbs. |
| C. Pentaerythritol | 316 lbs. |
| D. Sublimed litharge (or other alcoholysis cat.) | 0.5 lb. |
| E. Phthalic anhydride | 605 lbs. |
| F. Malic acid | 45 lbs. |
| G. Xylol | 35 gals. |
| H. Vinyl toluene | 1,950 lbs. |
| I. Ditertiary butyl peroxide | 20 lbs. |
| J. VM&P naphtha of Example I | 421 gals. |
| K. 2, 5 ditertiary butyl hydroquinone | 20 grams. |

(H and I mixed)

Heat A and B together to gain 400° F. Add C and D, gain 450° F. and hold for optimum monoglyceride content. Then gain 400–450° F., and hold to an acid number of about 30 or lower. Let batch cool to 350° F. and add F, G and one-sixth of the mixture of H and I. Gain reflux (270°–290° F.) and hold 20 minutes. Then add another sixth of the mixture of H and I. Repeat at 20-minute intervals until all of the mixture has been added. Then hold at reflux or a viscosity of Y–Z (Gardner-Holdt) at 60% non-volatile content in J. Add J to thin the batch and then add K as a stabilizer.

The finished product has a non-volatile content of about 60%, a Gardner-Holdt viscosity of Y to Z and an acid number of 10–12 based on the finished solution. The resin of the solution has the same attributes as that of Example I and when blended with about 5–40% by weight of solvent-soluble alkylated amine/aldehyde resin, the blend can be baked to non-yellowing, protective thermoset films. Typical amine/aldehyde resins are butylated urea/formaldehyde resins and butylated aminotriazine/aldehyde resins such as butylated melamine/formaldehyde and/or benzoguanamine/formaldehyde resins. The alcohols used to alkylate such resins are alkanols of 4–8 carbons. The aldehydes can vary widely in carbon content but formaldehyde or compounds yielding formaldehyde are preferred.

Example XI

This example illustrates a typical formulation of a wet ink varnish prepared from alkyd resins of the invention:

|   | Lbs. |
|---|---|
| A. Mineral spirits [1] | 200 |
| B. Alkyd resin solution of Examples I–VI or X | 320 |
| C. n-Butanol | 10 |
| D. Butylated urea/formaldehyde resin solution of Example VII | 168 |
| E. Grease solution of Example VII | 4 |
| F. Mineral spirits [1] | 40 |

[1] Has a Kauri Butanol value of 36–40, an initial boiling point of 295–331° F. and a dry point of 373–410° F.

The materials are charged to a mixing kettle in the order named and mixed together until homogeneous. The resulting coating composition has a solids content of about 40% by weight, and a viscosity of about 35 seconds in a No. 4 Ford cup.

The coating composition is applied over wet ink lithographing on heavy metal (e.g. 18 gauge), light metal, or tin plate by rollcoat application. It cures to a hard, tough, glossy non-yellowing film when baked for 15–18 minutes at 210–325° F.

From the foregoing description of the invention, it will be clear that numerous variations can be exercised in adapting the "styrenated" alkyds to particular coating problems. When desired, pigments, fillers and extenders of all kinds and types can be used, including inorganic, metallic and organic pigments. The amounts can be varied widely so as to secure metallescence, translucency, opacity, high gloss, medium gloss or flat, nongloss. The alkyds can be used without pigmentation (i.e. clear) either alone or with modifying amounts of amine/aldehyde resin(s). Other modifications in the amounts and kinds of starting materials have already been described hereinabove.

It will be understood that the expressions "styrenating," "styrenated" and "styrenation" are used herein to identify the peroxide-catalyzed copolymerization of ethylenically unsaturated fatty acids of the alkyds with styrene or substituted styrene, such as vinyl toluene. While it is within the principles of the invention to use such drying oils as linseed, tung, fish oils (or their acids), etc., thereby to prepare any of the conventional alkyds which can be "styrenated," it will be understood that such oils and acids lead to yellowing during baking, even when used in such proportions to (e.g.) styrene that the finished resins are non-drying. Accordingly, the invention is preferably restricted to the use of oils and/or acids which provide non-yellowing products.

Having described my invention, what I claim is:

1. A resinous non-yellowing composition which is a styrenated, fatty-acid-modified, malic-acid-modified alkyd having the following materials interesterified and copolymerized: (a) fatty acids selected from the group consisting of soybean oil acids, safflower oil acids, dehydrated castor oil acids, tall oil acids, and mixtures thereof, 19–34% by weight; (b) saturated aliphatic polyols having 3–6 carbons and at least 3 esterifiable hydroxyls, 8.5–15%; (c) non-ethylenic carboxylic acid having 8–10 carbons and 2 esterifiable carboxyl groups, 13–22% by weight; (d) malic acid, 1–4% by weight; and (e) styrenating material selected from the group consisting of styrene and the vinyl toluenes, 34–50% by weight; said percentages being based on the total starting materials and totaling 100%, and said resinous composition being further characterized (A) by having the total number of alcoholic hydroxyl groups in the starting materials present in about a 4–10 molar percent excess over the total number of carboxyl groups in said starting materials, and (B) by having the molar ratio of total fatty acid carboxyl groups to total alcoholic hydroxyl groups at about 1 to 3–3.4.

2. A composition as claimed in claim 1 wherein dehydrated castor oil acids and soybean oil acids constitute the total oil acids and together provide a molar ratio of dehydrated castor oil acids to soybean oil acids between about 0.33 and 0.55 to 1.

3. A composition as claimed in claim 2 wherein said non-ethylenic dibasic acid of (d) consists of phthalic anhydride.

4. A composition as claimed in claim 3 wherein said styrenating material of (e) consists of vinyl toluenes.

5. A composition as claimed in claim 4 wherein said polyol of (b) consists of pentaerythritol.

6. A composition as claimed in claim 4 wherein said polyol of (b) consists of glycerine.

7. A composition as claimed in claim 5 wherein said fatty acids and a part of the polyol are introduced in the form of soybean oil and dehydrated castor oil.

8. A composition as claimed in claim 1 wherein said soybean oil acids of (a) are introduced in the form of soybean oil.

9. A thermosettable coating composition which comprises a vehicle consisting of a homogeneous single-phase organic solvent solution of (I) a resinous composition as claimed in Claim 1 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

10. A coating composition as claimed in claim 9 wherein said alkylated amine/aldehyde resin is a butylated urea/formaldehyde resin.

11. A thermosettable coating composition which comprises a vehicle consisting of a homogeneous single-phase organic solvent solution of (I) a resinous composition as claimed in claim 2 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

12. A thermosettable coating composition which comprises a vehicle consisting of a homogeneous single-phase organic solvent solution of (I) a resinous composition as claimed in claim 3 and (II) 5–40% by weight, based on (I) of alkylated amine/aldehyde resin selected from the group consisting of alkylated urea/aldehyde resin and alkylated aminotriazine/aldehyde resin, said alkylating groups having 4–8 carbon atoms.

13. A thermosettable coating composition which comprises a vehicle consisting of a homogeneous single-phase organic solvent solution of (I) a resinous composition as claimed in claim 4 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

14. A thermosettable coating composition which comprises a vehicle consisting of a homogeneous single-phase organic solvent solution of (I) a resinous composition as claimed in claim 5 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

15. A thermosettable coating composition which comprises a vehicle consisting of a homogeneous single-phase organic solvent solution of (I) a resinous composition as claimed in claim 6 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

16. A thermosettable coating composition which comprises a vehicle consisting of a homogeneous single-phase organic solvent solution of (I) a resinous composition as claimed in claim 7 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

17. A thermosettable coating composition which comprises a vehicle consisting of a homogeneous single-phase organic solvent solution of (I) a resinous composition as claimed in claim 8 and (II) 5–40% by weight, based on (I), of alkylated amine/aldehyde resin selected from the group consisting of alkylated urea/aldehyde resin and alkylated aminotriazine/aldehyde resin, said alkylating groups having 4–8 carbon atoms.

18. A coating composition as claimed in claim 1 which includes pigment.

19. A coating composition as claimed in claim 7 which includes pigment.

20. A coating composition as claimed in claim 8 which includes pigment.

References Cited

UNITED STATES PATENTS

| | | | |
|---|---|---|---|
| 2,560,592 | 7/1951 | Opp et al. | 260—22 |
| 2,590,653 | 3/1952 | Schmutzler | 260—22 |
| 2,743,249 | 4/1958 | Kirsch | 260—22 |
| 2,986,543 | 5/1961 | Daniel | 260—22 |
| 3,057,824 | 10/1962 | Lebras et al. | 260—22 |

DONALD E. CZAJA, *Primary Examiner.*

R. W. GRIFFIN, *Assistant Examiner.*